(12) United States Patent
Park et al.

(10) Patent No.: US 11,296,359 B2
(45) Date of Patent: Apr. 5, 2022

(54) NON-AQUEOUS ELECTROLYTE SOLUTION AND LITHIUM SECONDARY BATTERY INCLUDING THE SAME

(71) Applicant: LG Chem, Ltd., Seoul (KR)

(72) Inventors: Ji Hye Park, Daejeon (KR); Song Taek Oh, Daejeon (KR)

(73) Assignee: LG Energy Solution, Ltd.

( * ) Notice: Subject to any disclaimer, the term of this patent is extended or adjusted under 35 U.S.C. 154(b) by 263 days.

(21) Appl. No.: 16/606,937

(22) PCT Filed: Aug. 29, 2018

(86) PCT No.: PCT/KR2018/010013
§ 371 (c)(1),
(2) Date: Oct. 21, 2019

(87) PCT Pub. No.: WO2019/054667
PCT Pub. Date: Mar. 21, 2019

(65) Prior Publication Data
US 2020/0136188 A1    Apr. 30, 2020

(30) Foreign Application Priority Data

Sep. 15, 2017  (KR) .................. 10-2017-0118694
Aug. 28, 2018  (KR) .................. 10-2018-0101413

(51) Int. Cl.
*H01M 10/0569* (2010.01)
*H01M 10/0525* (2010.01)
(Continued)

(52) U.S. Cl.
CPC ... *H01M 10/0569* (2013.01); *H01M 10/0525* (2013.01); *H01M 10/0567* (2013.01);
(Continued)

(58) Field of Classification Search
CPC ........ H01M 10/0525; H01M 10/0567; H01M 10/0569; H01M 10/48; H01M 10/488;
(Continued)

(56) References Cited

U.S. PATENT DOCUMENTS

2005/0069761 A1   3/2005  Palanisamy et al.
2016/0062504 A1   3/2016  Hwang et al.
(Continued)

FOREIGN PATENT DOCUMENTS

CN   1423127   *  6/2003  ............. G01N 31/16
CN   1886851 A   12/2006
(Continued)

OTHER PUBLICATIONS

Extended European Search Report including Written Opinion for Application No. EP18856652.5 dated Jun. 19, 2020, 3 pgs.
(Continued)

*Primary Examiner* — Carlos Barcena
(74) *Attorney, Agent, or Firm* — Lerner, David, Littenberg, Krumholz & Mentlik, LLP (57) ABSTRACT

A non-aqueous electrolyte solution and a lithium secondary battery including the same are disclosed herein. In some embodiments, a non-aqueous electrolyte solution includes an HF indicator, and a pouch-type lithium secondary battery includes a pouch case having a transparent identification part for observing the interior of the pouch-type battery from the exterior of the pouch case. Defects generated during the preparation of the secondary battery may be visually identified based on the presence of hydrofluoric acid without disassembling the pouch-type battery.

10 Claims, 6 Drawing Sheets

(51) Int. Cl.
*H01M 10/0567* (2010.01)
*H01M 10/48* (2006.01)
*H01M 4/02* (2006.01)

(52) U.S. Cl.
CPC ...... *H01M 10/48* (2013.01); *H01M 2004/027* (2013.01); *H01M 2004/028* (2013.01)

(58) Field of Classification Search
CPC ..... H01M 2004/027; H01M 2004/028; H01M 50/116
See application file for complete search history.

(56) References Cited

U.S. PATENT DOCUMENTS

| | | | |
|---|---|---|---|
| 2016/0146739 A1 | 5/2016 | Lee et al. | |
| 2016/0272818 A1 | 9/2016 | Morris | |
| 2017/0229743 A1 | 8/2017 | Ito | |
| 2018/0254440 A1* | 9/2018 | Paz | H01M 50/147 |

FOREIGN PATENT DOCUMENTS

| | | |
|---|---|---|
| CN | 103094615 A | 5/2013 |
| CN | 106663770 A | 5/2017 |
| CN | 106953051 A | 7/2017 |
| EP | 1673830 A2 | 6/2006 |
| EP | 2602855 B1 | 2/2015 |
| JP | 2010153289 A | 7/2010 |
| JP | 201453308 A | 3/2014 |
| JP | 2014157663 A | 8/2014 |
| KR | 100923860 B1 | 10/2009 |
| KR | 20130076700 A | 7/2013 |
| KR | 20140144996 A | 12/2014 |
| KR | 20150131368 A | 11/2015 |
| KR | 20160062504 A | 6/2016 |
| KR | 101653901 B1 | 9/2016 |

OTHER PUBLICATIONS

International Search Report from Application No. PCT/KR2018/010013 dated Mar. 22, 2019, 2 pages.
Lee at al., "A pyrocatechol violet-titanium alkoxide complex for HF sensing: Study on the complex structure and application", Dyes and Pigments, vol. 127, Jan. 2016, pp. 133-141.
Chinese Search Report for Application No. 201880027458.2 dated Nov. 9, 2021, 3 pages.

* cited by examiner

FIG. 2A — (a) SECONDARY BATTERY OF COMPARATIVE EXAMPLE

FIG. 2B — (b-1) SECONDARY BATTERY OF EXAMPLE 2 BEFORE CHARGE/DISCHARGE CYCLE

FIG. 2C — (b-2) SECONDARY BATTERY OF EXAMPLE 2 AFTER CHARGE/DISCHARGE CYCLE

FIG. 3

NON-AQUEOUS ELECTROLYTE SOLUTION AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/010013, filed on Aug. 29, 2018, which claims priority from Korean Patent Application Nos. 2017-0118694, filed on Sep. 15, 2017, and 2018-0101413, filed on Aug. 28, 2018, the disclosures of which are incorporated by reference herein.

TECHNICAL FIELD

The present invention relates to a non-aqueous electrolyte solution and a lithium secondary battery including the same, and particularly, to a non-aqueous electrolyte solution including a HF indicator and a pouch-type lithium secondary battery including the same.

BACKGROUND ART

Currently, in line with the rapid development of electric, electronic, communication, and computer industries, a significant amount of research has been conducted on high performance, high stability batteries which may be used as driving power sources therefor, and, among them, a lithium secondary battery is receiving the most attention because the lithium secondary battery is advantageous in that energy density per unit weight is about three times higher than that of a conventional lead-acid battery, a nickel-cadmium battery, a nickel-hydrogen battery, or a nickel-zinc battery, and fast charging is possible.

Lithium secondary batteries may be divided into a lithium ion battery using a liquid electrolyte solution and a lithium polymer battery using a polymer electrolyte depending on the type of the electrolyte used.

It is important for the lithium ion battery to constantly maintain quality of the electrolyte solution, and the quality is evaluated according to amounts of water, hydrofluoric acid (HF), and anions contained in the electrolyte solution.

That is, when a trace amount of water or an anion component ($Cl^-$, $SO_4^-$, etc.) is contained in the electrolyte solution, a lithium salt, such as $LiPF_6$ or $LiBF_4$, among components of the electrolyte solution of the secondary battery reacts therewith to generate a vapor or gas, such as free HF or hydrochloric acid (HCl) (see the following Reaction Formula 1)

[Reaction Formula 1]

$LiPF_6+4H_2O \rightarrow LiF+5HF+H_3PO_4$

In this case, when a concentration of the generated HF gas is normally increased to 150 ppm or more, the HF gas causes a rapid oxidation reaction to degrade the performance of a negative electrode, and manganese (Mn) is dissolved from a positive electrode by the HF gas to reduce battery lifetime. Furthermore, the HF gas becomes a cause of battery explosion.

Thus, control of the concentration of the HF gas and water in the non-aqueous electrolyte solution to be less than a few ppm during the preparation of the lithium secondary battery is an important issue.

Recently, a method has been used in which, after quality inspection is performed to measure the concentration and amount of water and HF in the electrolyte solution using an acid-base titration method or a concentration analysis method before shipping products, the products are shipped.

In the acid-base titration method, an electrolyte solution is diluted with deionized water to be used as a sample, a basic material, such as NaOH, is mixed with deionized water to be used as a titration reagent, the time when the color of the indicator changes is measured to obtain an end point, and an amount of an acid is calculated using the end point. However, since the method is to detect HF present in the electrolyte solution before the electrolyte solution is injected into the lithium secondary battery, it is disadvantageous in that HF gas generated in the secondary battery after the injection may not be measured. Furthermore, in a case in which a lithium bis(oxalate)borate (LiBOB) component is present in the electrolyte solution, since the water contained in the titration reagent and the water used to dilute the electrolyte solution react with the LiBOB to form boric acid and both the boric acid formed and the HF are detected, the method is disadvantageous in that it is difficult to calculate an accurate concentration of the HF.

Also, the concentration analysis method is a method of selectively analyzing the concentration of HF in the electrolyte solution containing the HF. However, this method has a limitation in that the measurement of the HF gas generated in the secondary battery may not be possible, because the acid reacts with the water in the titration reagent and, simultaneously, reacts continuously with moisture in the air over time to continuously increase the amount of the acid.

Thus, there is a need to develop a method which may more simply and easily detect HF gas generated after the preparation of a secondary battery without disassembling the secondary battery.

PRIOR ART DOCUMENT

Korean Patent No. 10-0923860

DISCLOSURE OF THE INVENTION

Technical Problem

An aspect of the present invention provides a non-aqueous electrolyte solution including a hydrofluoric acid indicator (hereinafter, referred to as 'HF indicator').

Another aspect of the present invention provides a lithium secondary battery in which HF generated during the preparation of the secondary battery may be easily detected by including the non-aqueous electrolyte solution.

Technical Solution

According to an aspect of the present invention,
there is provided a non-aqueous electrolyte solution including an electrolyte salt, an organic solvent, and a HF indicator.

The HF indicator is a material in which discoloration occurs when exposed to HF, wherein, as a representative example, the HF indicator may include pyrocatechol violet.

The HF indicator may be included in an amount of 0.1 wt % to 0.4 wt %, particularly 0.1 wt % to 0.3 wt %, and more particularly 0.1 wt % to 0.2 wt % based on a total weight of the non-aqueous electrolyte solution so that the HF indicator may be visually confirmed.

According to another aspect of the present invention, there is provided a pouch-type secondary battery including: an electrode assembly including a positive electrode, a negative electrode, and a separator disposed between the positive electrode and the negative electrode; a non-aqueous electrolyte solution; and a pouch case accommodating the electrode assembly and the non-aqueous electrolyte solution, wherein the pouch case includes:

a lower case including an accommodating part which accommodates the electrode assembly and the non-aqueous electrolyte solution, and an upper case formed in one piece with the lower case to seal the accommodating part from the exterior of the pouch case, wherein at least one of the lower case and the upper case includes a transparent identification part (observation part) for internal observation of the accommodating part from the exterior of the pouch case.

The transparent identification part (observation part) may have at least one shape of a circular shape, a polygonal shape, and a rectangular shape.

The transparent identification part (observation part) may be formed by adhering a polyethylene (PE) resin to both sides of a hole formed by punching the pouch case.

An area of the transparent identification part (observation part) may be in a range of 1% to 10%, for example, 1% to 7% of a total area of one surface of the pouch case.

Advantageous Effects

In the present invention, generation of HF gas may be visually confirmed without disassembling a cell by providing a non-aqueous electrolyte solution including a HF indicator, which may accurately measure the generation of hydrofluoric acid by changing its color when it is exposed to the HF gas, and a pouch case in which a transparent identification part capable of observing the inside is formed. Thus, since a secondary battery from which an excessive amount of HF gas is generated may be easily detected in a secondary battery production line, a defect detection operation may be performed easily and accurately, and, thus, an effect of minimizing defect rate of products may be achieved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

100: Pouch-type secondary battery
110*a*: Upper case
110*b*: Lower case
140: Electrode assembly accommodating part
120: Sealing part
200: Hole
210: Transparent film
130: Electrode assembly
170*a*: Positive electrode lead
170*b*: Negative electrode lead
200*a*: Non-aqueous electrolyte solution of Comparative Example observed through the hole of the pouch-type secondary battery
200*b*: Non-aqueous electrolyte solution of secondary battery of Example 2 observed through the hole before charge/discharge cycle
200*c*: Non-aqueous electrolyte solution of the secondary battery of Example 2 observed through the hole after the charge/discharge cycle

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

First, the present invention provides a system capable of visually measuring the generation of HF gas in a lithium secondary battery used as a power source for driving portable electronic devices, such as a video camera, a mobile phone, and a notebook PC, before they are manufactured.

For this purpose, the present invention provides a non-aqueous electrolyte solution capable of confirming the generation of HF gas and a pouch-type lithium secondary battery including the same.

Non-Aqueous Electrolyte Solution

Specifically, in an embodiment of the present invention, provided is a non-aqueous electrolyte solution including an electrolyte salt, an organic solvent, and, as an additive, a HF indicator capable of effectively detecting HF gas generated in an electrolyte even under high and low temperature conditions.

(1) Electrolyte Salt

First, any lithium salt typically used in an electrolyte solution for a lithium secondary battery may be used as a lithium salt included as the electrolyte salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

A concentration of the electrolyte salt may be in a range of 0.5 M to 3 M, for example, 0.5 M to 2 M. In a case in which the concentration of the electrolyte salt satisfies the above range, since good ion transfer characteristics (i.e., cation transference number) of the lithium cation ($Li^+$) may be secured due to an increase in lithium cations present in the non-aqueous electrolyte solution and an effect of reducing diffusion resistance of lithium ions may be achieved, an effect of improving cycle capacity characteristics and output characteristics may be achieved. In a case in which the maximum concentration of the lithium salt is greater than 3 M, viscosity of the non-aqueous electrolyte solution is increased to degrade low-temperature characteristics and wetting properties of the secondary battery, and, as a result, battery performance is degraded.

(2) Organic Solvent

Also, the organic solvent is not limited as long as it may minimize decomposition due to an oxidation reaction during charge and discharge of the secondary battery and may exhibit desired characteristics with the additive. For example, an ether-based solvent, an ester-based solvent, or an amide-based solvent may be used alone or as a mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Furthermore, the ester-based solvent may include at least one compound selected from the group consisting of a cyclic carbonate compound, a linear carbonate compound, a linear ester compound, and a cyclic ester compound.

Among these compounds, specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, σ-valerolactone, and ε-caprolactone, or a mixture of two or more thereof, but the present invention is not limited thereto.

Among the ester-based solvents, since the cyclic carbonate-based compound well dissociates the lithium salt in the electrolyte due to high permittivity as a highly viscous organic solvent, the cyclic carbonate-based compound may be preferably used. Since an electrolyte solution having high electrical conductivity may be prepared when the above cyclic carbonate-based compound is mixed with the low viscosity, low permittivity linear carbonate-based compound, such as dimethyl carbonate and diethyl carbonate, and the linear ester-based compound in an appropriate ratio, the cyclic carbonate-based compound may be more preferably used.

(3) HF Indicator

In the non-aqueous electrolyte solution according to the embodiment of the present invention, the expression "HF indicator" refers to a material in which discoloration occurs when it is exposed to or contacted with HF gas so that a degree of change in color may be visually measured.

As a representative example, the HF indicator may include pyrocatechol violet represented by the following Formula 1 which is soluble in water and an organic solvent and generally has a red color, wherein the red color becomes lighter and turns to yellow when exposed to HF gas.

[Formula 1]

With respect to a typical acid detection indicator, it may not selectively detect only HF, but, since the discoloration of the HF indicator occurs when a trace amount of HF is generated to cause a reaction, a change in color of the electrolyte solution may be effectively detected even with a small amount of the HF indicator.

In this case, it is desirable that the HF indicator is included in the minimum amount in a range in which the change in the electrolyte solution may be visually confirmed so as to prevent a side reaction. Specifically, the HF indicator may be included in an amount of at least 0.1 wt % to 0.5 wt % based on a total weight of the non-aqueous electrolyte solution. In a case in which the HF indicator is included within the above range, the HF indicator may secure visual HF gas detection performance without the degradation of the battery performance due to the side reaction in the electrolyte solution. Specifically, in a case in which the HF indicator is included in an amount of 0.4 wt % or less, particularly 0.3 wt % or less, and more particularly 0.2 wt % or less based on the total weight of the non-aqueous electrolyte solution, a resistance increase phenomenon may be further improved by increasing solubility with respect to the organic solvent.

(4) Additive

The non-aqueous electrolyte solution of the present invention may further include an additive for forming a solid electrolyte interphase (SEI), if necessary. As the additive for forming an SEI which may be used in the present invention, at least one additional additive selected from the group consisting of a sultone-based compound, a halogen-substituted carbonate-based compound, a nitrile-based compound, a cyclic sulfite-based compound, and a cyclic carbonate-based compound may be included.

The sultone-based compound may include at least one compound selected from the group consisting of 1,3-propane sultone (PS), 1,4-butane sultone, ethene sultone, 1,3-propene sultone (PRS), 1,4-butene sultone, and 1-methyl-1,3-propene sultone. The sultone-based compound may be included in an amount of 0.3 wt % to 5 wt %, for example, 1 wt % to 5 wt % based on the total weight of the non-aqueous electrolyte solution. In a case in which the amount of the sultone-based compound in the non-aqueous electrolyte solution is greater than 5 wt %, since a thick film is formed due to the excessive amount of the additive, output degradation and an increase in resistance may occur.

Also, the halogen-substituted carbonate-based compound may include fluoroethylene carbonate (FEC) and may be included in an amount of 5 wt % or less based on the total weight of the non-aqueous electrolyte solution. In a case in which the amount of the halogen-substituted carbonate-based compound is greater than 5 wt %, cell swelling inhibition performance may deteriorate.

Furthermore, the nitrile-based compound may include at least one compound selected from the group consisting of succinonitrile (SN), adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The nitrile-based compound may be included in an amount of 5 wt % or less based on the total weight of the non-aqueous electrolyte solution, and, in a case in which the amount of the nitrile-based compound is greater than 5 wt %, since the resistance is increased due to an increase in the film formed on the surface of the electrode, the battery performance may deteriorate.

Also, the cyclic sulfite-based compound may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite, and may be included in an amount of 5 wt % or less based on the total weight of the non-aqueous electrolyte solution. In a case in which the amount of the cyclic sulfite-based compound is greater than 5 wt %, since a thick film is formed due to the excessive amount of the additive, the output degradation and the increase in resistance may occur.

Furthermore, the cyclic carbonate-based compound may include vinylene carbonate (VC) or vinyl ethylene carbonate, and may be included in an amount of 3 wt % or less based on the total weight of the non-aqueous electrolyte solution. In a case in which the amount of the cyclic carbonate-based compound in the non-aqueous electrolyte solution is greater than 3 wt %, the cell swelling inhibition performance may deteriorate.

Two or more of the additives may be mixed and included, and the additives may be included in a total amount of 20 wt % or less, for example, 10 wt % or less based on the total weight of the non-aqueous electrolyte solution. If the amount of the additives is greater than 20 wt %, the side reaction in the non-aqueous electrolyte solution may not only excessively occur during charge and discharge of the battery, but the additives may also not be sufficiently decomposed at a high temperature so that the additives may remain as an unreacted material or precipitates in the non-aqueous electrolyte solution at room temperature, and, accordingly, life or resistance characteristics of the secondary battery may be degraded.

Pouch-Type Secondary Battery

Also, in an embodiment of the present invention, provided is a pouch-type lithium secondary battery including: an electrode assembly including a positive electrode, a negative electrode, and a separator disposed between the positive electrode and the negative electrode, a non-aqueous electrolyte solution, and a pouch case accommodating the electrode assembly and the non-aqueous electrolyte solution of the present invention, wherein the pouch case includes:

a lower case including an accommodating part configured to accommodate the electrode assembly, and an upper case formed in one piece with the lower case to seal the accommodating part, wherein at least one of the lower case and the upper case includes a transparent identification part (observation part) for internal observation.

(1) Pouch Case

First, the pouch case is composed of a multi-layer structure in which an internal resin layer, a metal layer, and an external resin layer are stacked.

Specifically, the internal resin layer, as an adhesive layer, may include at least one selected from the group consisting of a polyolefin resin, a copolymer of ethylene and acrylic acid, and a copolymer of propylene and acrylic acid. The polyolefin resin may specifically include casted polypropylene, a polypropylene-butylene-ethylene terpolymer, polypropylene, a chlorinated polypropylene (CPP) resin, polyethylene, or an ethylene-propylene copolymer.

In this case, the internal resin layer may have a thickness of 10 μm to 100 μm, for example, 10 μm to 80 μm.

The intermediate layer may include an aluminum metal layer. In this case, the intermediate layer may have a thickness of 60 μm to 100 μm.

The external resin layer may include a single layer of one selected from the group consisting of polyethylene, polypropylene, polyethylene terephthalate, nylon, low density polyethylene (LDPE), high density polyethylene (HDPE), and linear low density polyethylene (LLDPE), or a composite layer of two or more thereof.

In this case, the external resin layer may have a thickness of 10 μm to 100 μm, for example, 10 μm to 80 μm.

The pouch case may include a lower case including an accommodating part configured to accommodate the electrode assembly and an upper case formed in one piece with the lower case to seal the accommodating part.

In this case, at least one of the lower case and the upper case may include a transparent identification part (observation part) for internal observation.

The transparent identification part (observation part) may have at least one shape of a circular shape, a polygonal shape, or a rectangular shape.

Figure 1A:
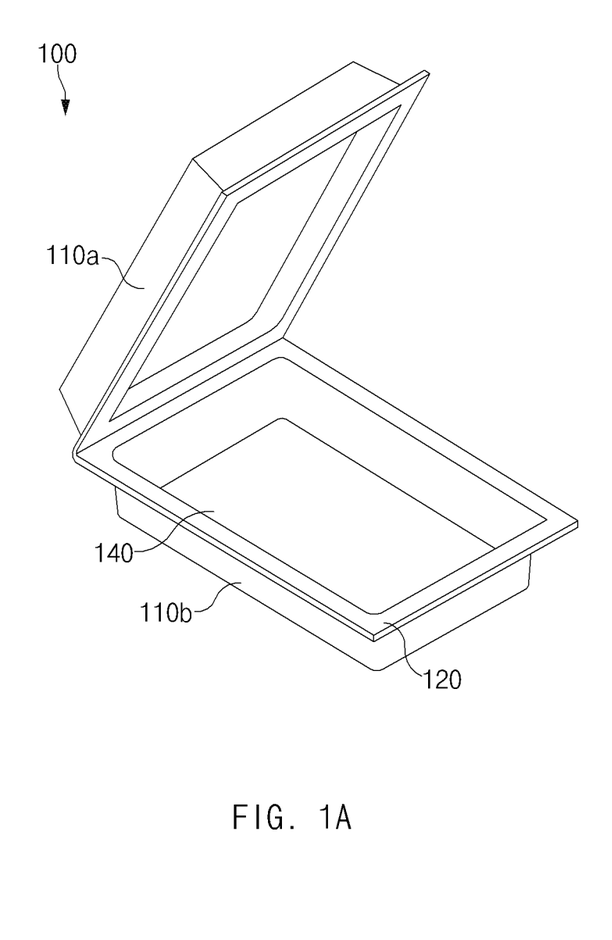
FIGS. 1a to 1d illustrate a method of preparing a pouch-type secondary battery of the present invention.
Figure 1B:
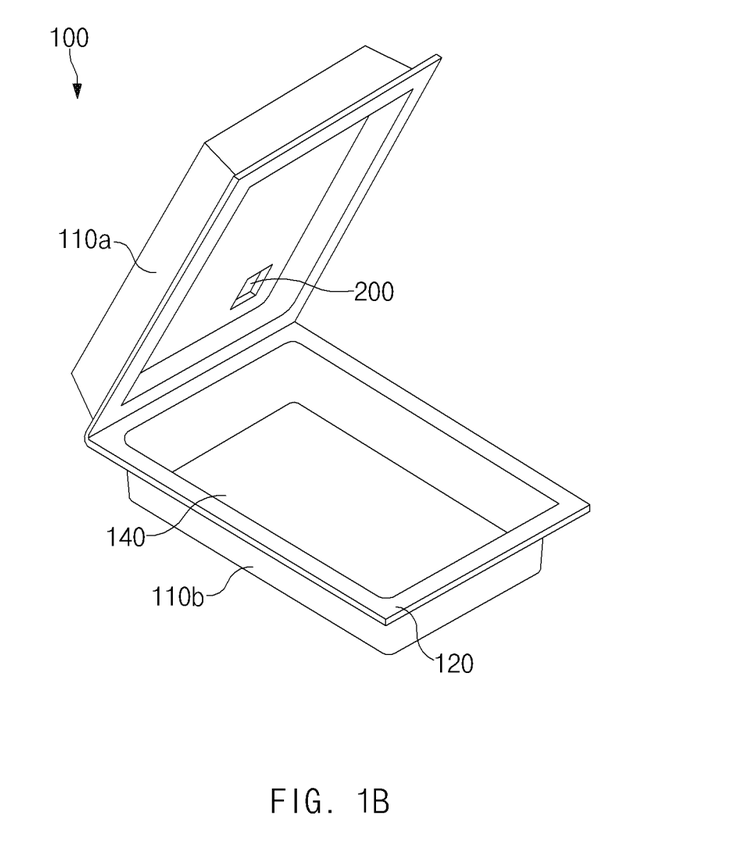
Figure 1C:
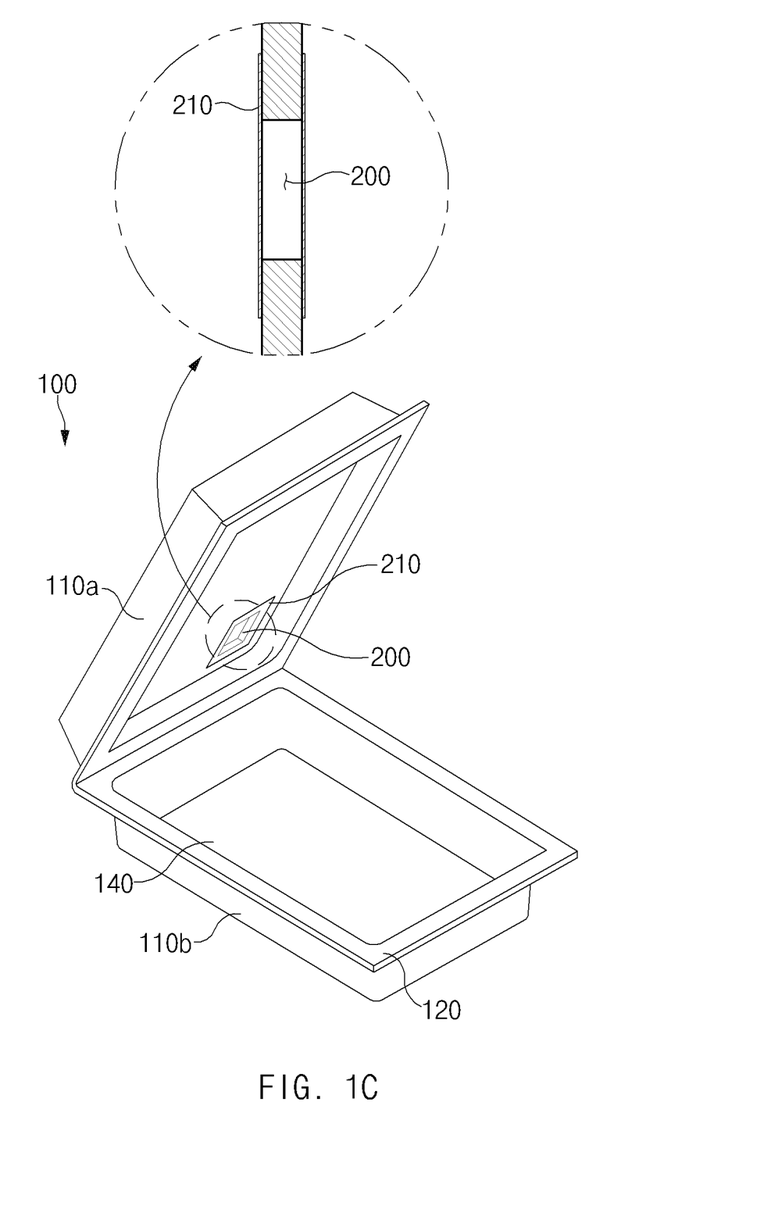

After a portion of the lower or upper case of the aluminum pouch case is punched to form a hole 200 (see FIG. 1*b*), the transparent identification part (observation part) may be formed by additionally adhering a polyethylene (PE) resin, as a transparent film 210, to both sides of the hole (see FIG. 1*c*).

The adhesion may be performed by thermal bonding.

In this case, the thermal bonding may be performed at a temperature of 120° C. to 170° C., for example, 150° C. for 1 second to 15 minutes, particularly 1 second to 5 minutes, and more particularly 5 seconds to 20 seconds.

An area of the transparent identification part (observation part) formed may be in a range of 1% to 10%, particularly 1% to 7%, and more particularly 1% to 5% of a total area of one surface of the pouch case.

In a case in which the area of the transparent identification part (observation part) is within the above range, strength and safety of the pouch case may be secured and, simultaneously, discoloration of the electrolyte solution during HF gas exposure may be visually easily confirmed. However, if the area of the transparent identification part (observation part) is outside the above range, that is, the area is greater than 10%, since the electrolyte solution in the secondary battery is excessively exposed to light, life characteristics may be degraded.

As described above, in the present invention, since whether or not hydrofluoric acid is generated may be visually confirmed without disassembling a cell by providing the pouch-type lithium secondary battery which includes the non-aqueous electrolyte solution including the HF indicator capable of accurately measuring the generation of hydrofluoric acid by changing its color when exposed to the HF gas, a secondary battery from which an excessive amount of hydrofluoric acid is generated may be easily detected in a secondary battery production line, and thus, a defect detection operation may be performed easily and accurately. Therefore, an effect of minimizing defect rate of products may be achieved.

Hereinafter, a preferred embodiment of the present invention will be described in detail with reference to the accompanying drawings. FIGS. 1a to 1d are schematic process diagrams for preparing a pouch-type case according to an embodiment of the present invention.

First, referring to FIG. 1a, a pouch-type case 100 according to an embodiment of the present invention includes an upper case 110a, a lower case 110b, a sealing part 120 formed along outer circumferential surfaces of the upper case 110a and the lower case 110b, and an accommodating part 140 accommodating an electrode assembly. In this case, the upper case and the lower case are formed in one piece, and a surface where the upper case and the lower case are in contact with each other is bent and folded.

The upper case 110a and the lower case 110b are aluminum laminate sheets, wherein each of the upper case 110a and the lower case 110b may have a structure in which an inter resin layer, a metal layer, and an external resin layer are sequentially stacked.

The internal resin layer, as an adhesive layer, may include a single layer of one selected from the group consisting of a polyolefin resin, a copolymer of ethylene and acrylic acid, and a copolymer of propylene and acrylic acid, or a composite layer of two or more thereof.

The internal resin layer may have a thickness of 10 μm to 100 μm. In a case in which the thickness of the internal resin layer is less than 10 μm, interlayer adhesion may not be easy, and, in a case in which the thickness is greater than 100 μm, a lot of energy may be consumed during the interlayer adhesion.

The metal layer may be formed of aluminum, and, in addition, may be formed of one selected from the group consisting of an alloy of iron, carbon, chromium, and manganese; and an alloy of iron, carbon, chromium, and nickel, or a mixture thereof.

The external resin layer may be formed of one selected from the group consisting of a single layer of one selected from polyethylene, polypropylene, polyethylene terephthalate, nylon, low density polyethylene (LDPE), high density polyethylene (HDPE), and linear low density polyethylene (LLDPE) or a composite layer of two or more thereof, or a mixture thereof.

The external resin layer may have a thickness of 10 μm to 100 μm. In a case in which the thickness of the external resin layer is less than 10 μm, since the thickness of the external resin layer is excessively small, the external resin layer may not protect the metal layer and may be cut during fusion, and, in a case in which the thickness is greater than 100 μm, fusion between the pouch-type case 100 and an electrode lead may not be performed well.

Subsequently, referring to FIG. 1b, in the pouch-type case 100 according to the embodiment of the present invention, a portion of at least one of the upper case 110a and the lower case 110b, specifically, the upper case 110a is punched to form a hole 200.

The hole 200 may be formed to have an area of 1% to 10%, particularly 1% to 7%, and more particularly 1% to 5% of a total area of the upper case 110a.

In a case in which the area of the hole is within the above range, the strength and safety of the pouch case may be secured and, simultaneously, the discoloration of the electrolyte solution during HF gas exposure may be visually easily confirmed. If the area of the hole is outside the above range, since the electrolyte solution is exposed to light, the life characteristics may be degraded.

The hole may have at least one shape of a circular shape, a polygonal shape, or a rectangular shape.

Next, referring to FIG. 1c, the transparent film 210, such as a polyethylene (PE) resin, is additionally adhered to both sides of the punched hole 200.

In this case, the thermal bonding may be performed at a temperature of 120° C. to 170° C., for example, 150° C. for 1 second to 15 minutes, particularly 1 second to 5 minutes, and more particularly 5 seconds to 20 seconds.

In this case, it is desirable that a thickness of the transparent film 210 is smaller than a thickness of the pouch case, and the thickness of the transparent film 210 may specifically be about 30 μm or less, for example, 10 μm to 30 μm. In a case in which the thickness of the transparent film is less than 10 μm, there is a risk of damage by impact.

Figure 1D:
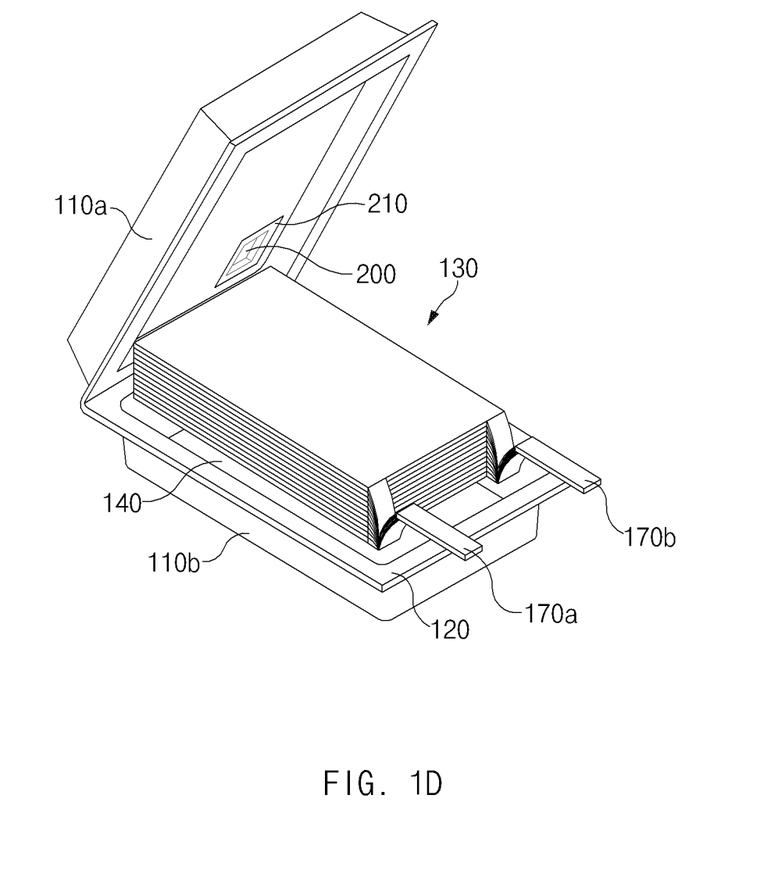

Subsequently, referring to FIG. 1d, an electrode assembly 130 is accommodated in the accommodating part 140 of the pouch case 100.

The electrode assembly 130 is a power generation device, in which a positive electrode and a negative electrode are sequentially stacked while a separator is disposed between the positive electrode and the negative electrode, wherein it is composed of a stacked type or stack and folding type structure.

The electrode assembly 130 includes a plurality of negative electrode tabs and a plurality of positive electrode tabs, which are extended from each electrode plate, and a positive electrode lead 170a and a negative electrode lead 170b which are respectively welded to the positive electrode tab and the negative electrode tab, wherein portions of the electrode leads are exposed to the outside of the pouch-type case 100.

Next, the internal resin layer of the upper case and the internal resin layer of the lower case are sealed by heat fusion through the application of heat and pressure (not shown), and the pouch-type secondary battery of the present invention is prepared by injecting the electrolyte solution of the present invention into the inside of the sealed case (not shown).

In this case, the portions of the electrode leads 170a and 170b exposed to the outside of the pouch-type case 100 are bonded to the upper case 110a and the lower case 110b.

(2) Electrode Assembly

In the pouch-type secondary battery according to the embodiment of the present invention, the electrode assembly is formed by sequentially stacking and winding a negative electrode including a negative electrode active material and a positive electrode including a positive electrode active material while a separator is disposed therebetween, wherein the electrode assembly may be prepared by a conventional method.

In this case, in the pouch-type secondary battery according to the embodiment of the present invention, the positive electrode and the negative electrode may be prepared by a conventional method and used.

(2-1) Positive Electrode

First, the positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}MnYO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{o p1}Co_{q1}Mn_{r2})$ $O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}CO_{1/3})O_2$, $Li(Ni_{0.6}Mn_{0.2}Co_{0.2})$ $O_2$, $Li(Ni_{0.5}Mn_{0.3}Co_{0.2})O_2$, $Li(Ni_{0.7}Mn_{0.15}CO_{0.15})O_2$, or $Li(Ni_{0.8}Mn_{0.1}Co_{0.1})$ $O_2$), or lithium nickel cobalt aluminum oxide (e.g., $LiNi_{0.8}Co_{0.15}Al_{0.15}O_2$, etc.).

The positive electrode active material may be included in an amount of 80 wt % to 99 wt %, for example, 85 wt % to 95 wt % based on a total weight of solid content in the positive electrode slurry.

In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode slurry.

Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, and thermal black; graphite powder such as natural graphite having a highly developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

(2-2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include a single material selected from the group consisting of a lithium-containing titanium composite oxide (LTO); a carbon-based material such as non-graphitizable carbon and graphite-based carbon; a complex metal oxide such as $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; $0<x \leq 1$; $1 \leq y \leq 3$; $1 \leq z \leq 8$); a lithium metal; a lithium alloy; a silicon-based alloy; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; and a conductive polymer, such as polyacetylene, or a mixture of two or more thereof.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, and thermal black; graphite powder such as natural graphite having a highly developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

(2-3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

Also, according to an embodiment of the present invention, a medium- and large-sized battery module or battery pack may include a plurality of the pouch-type secondary batteries that are electrically connected to one another. The medium- and large-sized battery pack may be used as a power source of at least one medium- and large-sized device selected from the group consisting of an electric vehicle (EV) including an electric car, a hybrid electric vehicle (HEV), and a plug-in hybrid electric vehicle (PHEV); an electric truck; an electric commercial vehicle; and a power storage system.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-aqueous Electrolyte Solution Preparation)

A non-aqueous electrolyte solution was prepared by adding 0.1 g of pyrocatechol violet to 99.9 g of a non-aqueous organic solvent (ethylene carbonate (EC):ethyl methyl carbonate (EMC)=3:7 vol %) in which 1 M $LiPF_6$ was dissolved.

(Electrode Assembly Preparation)

A positive electrode mixture slurry was prepared by adding 94 wt % of $LiCoO_2$ as a positive electrode active material, 3 wt % of carbon black as a conductive agent, and 3 wt % of polyvinylidene fluoride (PVDF), as a binder, to N-methyl-2-pyrrolidone (NMP) as a solvent. An about 20 μm thick aluminum (Al) thin film, as a positive electrode collector, was coated with the positive electrode mixture slurry, dried, and then roll-pressed to prepare a positive electrode.

Subsequently, a negative electrode mixture slurry was prepared by adding 96 wt % of carbon powder as a negative electrode active material, 3 wt % of PVDF as a binder, and 1 wt % of carbon black, as a conductive agent, to NMP as a solvent. A 10 μm thick copper (Cu) thin film, as a negative electrode collector, was coated with the negative electrode mixture slurry, dried, and then roll-pressed to prepare a negative electrode.

Subsequently, a 20 μm thick polyethylene (PE) separator film was disposed between the prepared electrodes, and the resultant product was wound and compressed to prepare an electrode assembly.

(Pouch-type Secondary Battery Preparation)

The pouch-type case 100 composed of the upper case 110*a* and the lower case 110*b* was prepared (see FIG. 1*a*), and 5% of a total area of the upper case 110*a* was punched to form the rectangular hole 200 (see FIG. 1*b*).

Subsequently, a 15 μm thick polyethylene (PE) resin was adhered to both sides of the hole 200 and then subjected to thermal bonding at a temperature of 150° C. for 10 seconds to form the transparent film 210 (see FIG. 1*c*).

The electrode assembly was accommodated in the lower case 110*b* of the pouch-type case (see FIG. 1*d*), the prepared non-aqueous electrolyte solution was injected thereinto, and the pouch-type case was then sealed to prepare a pouch-type lithium secondary battery.

Examples 2

A non-aqueous electrolyte solution was prepared in the same manner as in Example 1 except that 0.2 g of pyrocatechol violet was added to 99.8 g of a non-aqueous organic solvent (ethylene carbonate (EC):ethyl methyl carbonate (EMC)=3:7 vol %) during the preparation of the non-aqueous electrolyte solution.

Also, a pouch-type lithium secondary battery was prepared in the same manner as in Example 1 except that 7% of the total area of the upper case was punched to form a rectangular hole during the preparation of the pouch-type secondary battery.

Example 3

A non-aqueous electrolyte solution was prepared in the same manner as in Example 1 except that 0.3 g of pyrocatechol violet was added to 99.7 g of a non-aqueous organic solvent (ethylene carbonate (EC):ethyl methyl carbonate (EMC)=3:7 vol %) during the preparation of the non-aqueous electrolyte solution.

Also, a pouch-type lithium secondary battery was prepared in the same manner as in Example 1 except that 10% of the total area of the upper case was punched to form a rectangular hole during the preparation of the pouch-type secondary battery.

Example 4

A non-aqueous electrolyte solution and a pouch-type lithium secondary battery were prepared in the same manner as in Example 1 except that 0.4 g of pyrocatechol violet was added to 99.6 g of a non-aqueous organic solvent (ethylene carbonate (EC):ethyl methyl carbonate (EMC)=3:7 vol %) during the preparation of the non-aqueous electrolyte solution.

Example 5

A non-aqueous electrolyte solution and a pouch-type lithium secondary battery were prepared in the same manner as in Example 1 except that 0.5 g of pyrocatechol violet was added to 99.5 g of a non-aqueous organic solvent (ethylene carbonate (EC):ethyl methyl carbonate (EMC)=3:7 vol %) during the preparation of the non-aqueous electrolyte solution.

Comparative Example

Figure 2A:
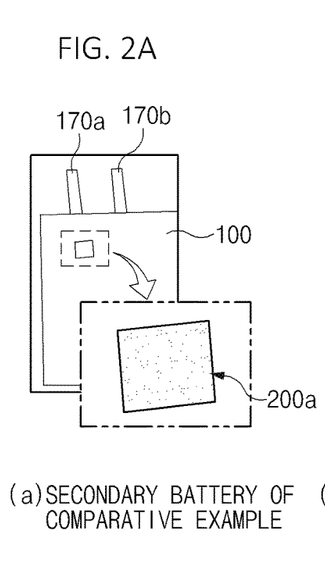
FIGS. 2A-C illustrates changes in the insides of the pouch-type secondary batteries depending on whether HF gas is generated or not, according to Experimental Example 1 of the present invention.

A non-aqueous electrolyte solution and a pouch-type lithium secondary battery were prepared in the same manner as in Example 1 except that a HF indicator was not included during the preparation of the non-aqueous electrolyte solution (see FIG. 2A).

EXPERIMENTAL EXAMPLES

Experimental Example 1

Each of the secondary batteries prepared in Example 2 and Comparative Example was charged to a state of charge (SOC) of 30% at a constant current of 0.1 C rate until a voltage reached 4.20 V (vs. Li) at a temperature of 25° C., and, subsequently, cut-off charged at a current of 0.33 C rate while maintaining a constant voltage of 4.20 V. Subsequently, during discharge, each secondary battery was discharged at a constant current of 0.33 C rate until the voltage reached 3.0 V (vs. Li) ($1^{st}$ cycle). After the above charge/discharge cycle was performed three times, the inside of the secondary battery was observed through the hole.

Figure 2B:
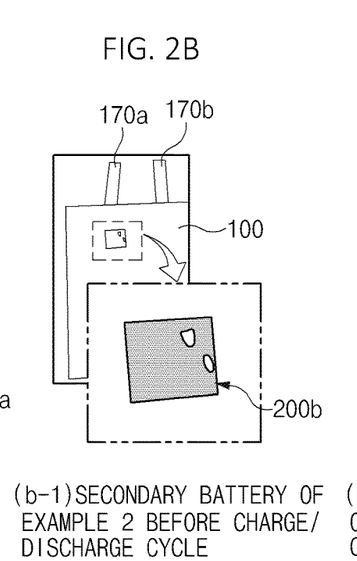
Figure 2C:
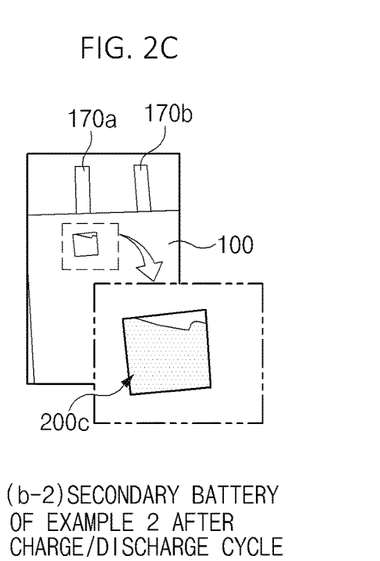

Referring to FIGS. 2B-2C, with respect to the secondary battery of Example 2 in which the non-aqueous electrolyte solution including the pyrocatechol violet additive was injected, a color of the non-aqueous electrolyte solution observed through a hole 200b before the charge/discharge cycle was red (see FIG. 2B), but it may be confirmed that the color of the non-aqueous electrolyte solution observed through a hole 200c changed to yellow by HF gas generated during three charge/discharge cycles (see FIG. 2C).

In contrast, with respect to the secondary battery of Comparative Example in which the non-aqueous electrolyte solution without the pyrocatechol violet additive was injected, it may be understood that a change in color of the non-aqueous electrolyte solution was not observed before and after the charge/discharge cycle (see FIG. 2A).

Experimental Example 2

Each of the secondary batteries prepared in Examples 1, 3, and 5 and Comparative Example was charged to a SOC of 50% at a constant current of 0.33 C rate until a voltage reached 4.20 V (vs. Li) at a temperature of 25° C., and, subsequently, cut-off charged at a current of 0.33 C rate while maintaining a constant voltage of 4.20 V. Subsequently, during discharge, each secondary battery was discharged at a constant current of 0.25 C rate until the voltage reached 3.0 V (vs. Li) to measure a resistance (ohm) value depending on discharge time (sec) from the beginning to 10 seconds. The results thereof are represented in FIG. 3.

Figure 3:
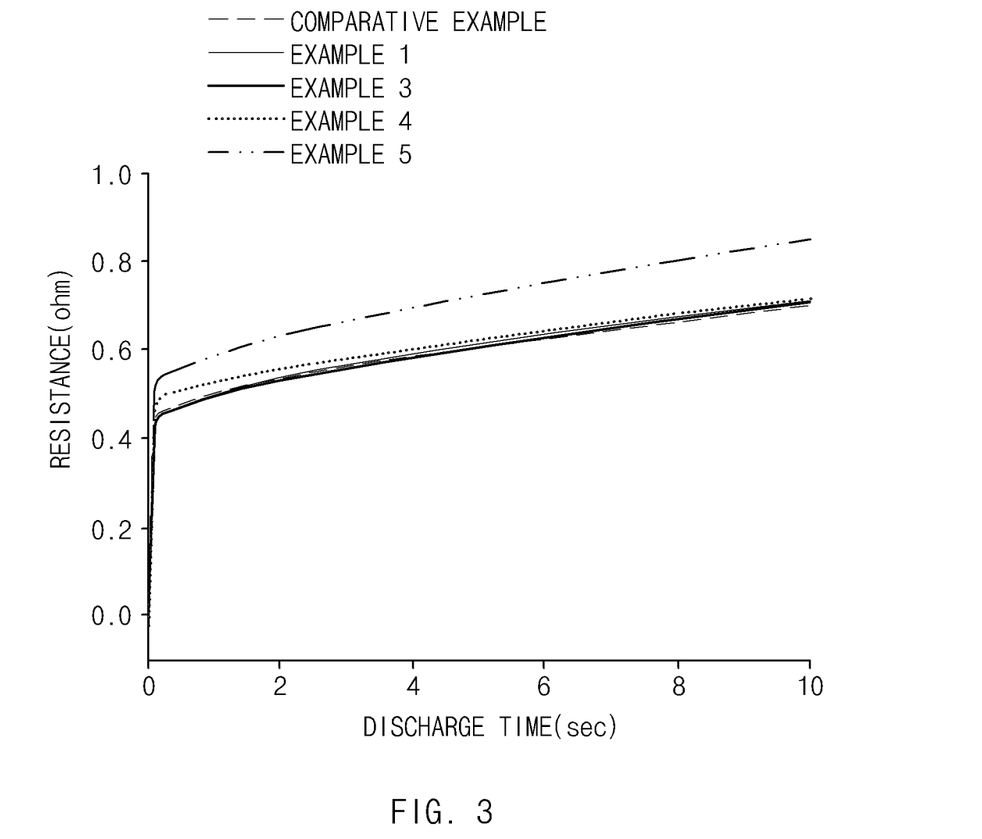
FIG. 3 is a graph showing changes in resistance depending on the amount of an additive according to Experimental Example 2 of the present invention.

Referring to FIG. 3, with respect to the pouch-type secondary batteries of Examples 1, 3, and 4 which included the non-aqueous electrolyte solutions including 0.4 g or less of the pyrocatechol violet additive, initial resistance was less than 0.5 ohm and resistance after discharging for 10 seconds was about 0.7 ohm or less, wherein it may be understood that these values were almost the same level as those of the pouch-type secondary battery of Comparative Example including the non-aqueous electrolyte solution without an additive.

With respect to the pouch-type secondary battery of Example 5 which included the non-aqueous electrolyte solution including 0.5 g of the pyrocatechol violet additive, since a portion of the pyrocatechol violet additive was not dissolved but remained in the non-aqueous electrolyte solution, it may be understood that resistance was slightly increased in comparison to those of the pouch-type secondary batteries of Examples 1, 3 and 4.

The invention claimed is:

1. A non-aqueous electrolyte solution, comprising:
   an electrolyte salt;
   an organic solvent; and
   a HF indicator,
   wherein the electrolyte salt and the HF indicator are mixed in the organic solvent, and
   wherein the HF indictor discolors when exposed to HF.

2. The non-aqueous electrolyte solution of claim 1, wherein the HF indicator comprises pyrocatechol violet.

3. The non-aqueous electrolyte solution of claim 1, wherein the HF indicator is included in an amount of 0.1 wt % to 0.4 wt % based on a total weight of the non-aqueous electrolyte solution.

4. The non-aqueous electrolyte solution of claim 1, wherein the HF indicator is included in an amount of 0.1 wt % to 0.3 wt % based on a total weight of the non-aqueous electrolyte solution.

5. The non-aqueous electrolyte solution of claim 1, wherein the HF indicator is included in an amount of 0.1 wt % to 0.2 wt % based on a total weight of the non-aqueous electrolyte solution.

6. A pouch-type secondary battery, comprising:
an electrode assembly including a positive electrode, a negative electrode, and a separator disposed between the positive electrode and the negative electrode;
the non-aqueous electrolyte solution of claim 1; and
a pouch case which accommodates the non-aqueous electrolyte solution and the electrode assembly,
wherein the pouch case comprises:
a lower case including an accommodating part which accommodates the electrode assembly and the non-aqueous electrolyte solution of claim 1, and
an upper case contacting the lower case to seal the accommodating part from the exterior of the pouch case,
wherein at least one of the lower case or the upper case comprises a transparent identification part for internal observation of the accommodating part from the exterior of the pouch case.

7. The pouch-type secondary battery of claim 6, wherein the transparent identification part has at least one shape of a circular shape, a polygonal shape, and a rectangular shape.

8. The pouch-type secondary battery of claim 6, wherein the transparent identification part includes a polyethylene (PE) resin on both sides of a hole extending from the exterior to the interior of the pouch case.

9. The pouch-type secondary battery of claim 6, wherein an area of the transparent identification part is in a range of 1% to 10% of a total area of one surface of the pouch case.

10. The pouch-type secondary battery of claim 9, wherein the area of the transparent identification part is in a range of 1% to 7% of the total area of one surface of the pouch case.

* * * * *